US008281583B2

(12) United States Patent
Kauss

(10) Patent No.: US 8,281,583 B2
(45) Date of Patent: Oct. 9, 2012

(54) HYDRAULIC CONTROL ASSEMBLY

(75) Inventor: Wolfgang Kauss, Francheville (FR)

(73) Assignee: Robert Bosch GmbH, Stuttgart (DE)

( * ) Notice: Subject to any disclaimer, the term of this patent is extended or adjusted under 35 U.S.C. 154(b) by 1017 days.

(21) Appl. No.: 12/297,410

(22) PCT Filed: Apr. 13, 2007

(86) PCT No.: PCT/EP2007/003280

§ 371 (c)(1),
(2), (4) Date: Oct. 16, 2008

(87) PCT Pub. No.: WO2007/121873

PCT Pub. Date: Nov. 1, 2007

(65) Prior Publication Data

US 2009/0094972 A1 Apr. 16, 2009

(30) Foreign Application Priority Data

Apr. 21, 2006 (DE) ......................... 10 2006 018 706

(51) Int. Cl.
*F16D 31/02* (2006.01)

(52) U.S. Cl. ............................... 60/452; 60/422; 60/468

(58) Field of Classification Search .................... 60/420, 60/422, 444, 452, 468

See application file for complete search history.

(56) References Cited

U.S. PATENT DOCUMENTS 2,946,347 A 7/1960 Ruhl
4,083,382 A 4/1978 Khatti et al.
4,184,512 A 1/1980 Pignolet
4,355,660 A 10/1982 Huffman
4,745,747 A * 5/1988 Krausse et al. ................. 60/452
5,138,838 A 8/1992 Crosser
5,273,069 A 12/1993 Akiyama et al.
5,305,789 A 4/1994 Rivolier
5,398,507 A * 3/1995 Akiyama et al. ................ 60/452
5,806,312 A * 9/1998 Kauss et al. .................... 60/452
5,862,831 A 1/1999 Chung
5,996,623 A 12/1999 Omberg
6,305,163 B1 * 10/2001 Paakkunainen ................. 60/422
6,327,959 B1 12/2001 Takahashi et al.
6,334,308 B1 * 1/2002 Sato et al. ....................... 60/422

(Continued)

FOREIGN PATENT DOCUMENTS

CA 2 231 498 5/1997

(Continued)

OTHER PUBLICATIONS

"Electro-Proportional Swivel Angle Control" BOSCJ Rexroth Group, Technical Data Sheet. RE 92 708 04.05 1/8 Apr. 2005.

(Continued)

*Primary Examiner* — Michael Leslie
(74) *Attorney, Agent, or Firm* — Michael J. Striker

(57) ABSTRACT

A hydraulic control assembly, in particular for controlling hydraulic consumers of a mobile machine, includes a load reporting line (26) that can be subjected to the highest load pressure of a plurality of hydraulic consumers, triggered simultaneously each via a respective main control valve (38, 57), and that is connectable by an end portion (**26*a*) to a pump regulator (25). A pressure limiting valve (50) limits the control pressure in the end portion (26*a*) of the load reporting line (26). The pressure limiting valve (50) is adjustable as a function of the magnitude of a pilot control signal serving to trigger a main control valve (38, 57**).

11 Claims, 3 Drawing Sheets

U.S. PATENT DOCUMENTS

| | | | |
|---|---|---|---|
| 6,349,543 | B1 | 2/2002 | Lisniansky |
| 6,367,365 | B1 | 4/2002 | Weickert et al. |
| 6,932,113 | B1 | 8/2005 | Kauss |
| 7,213,501 | B2 | 5/2007 | Kauss et al. |
| 7,337,807 | B2 | 3/2008 | Koo et al. |
| 7,634,961 | B2 | 12/2009 | Asakage et al. |
| 2002/0050295 | A1 | 5/2002 | Fiala et al. |
| 2003/0106420 | A1 | 6/2003 | Yoshino |

FOREIGN PATENT DOCUMENTS

| | | |
|---|---|---|
| DE | 27 51 946 | 7/1978 |
| DE | 34 22 978 | 1/1986 |
| DE | 37 09 504 | 10/1988 |
| DE | 43 08 004 | 10/1993 |
| DE | 196 08 801 | 9/1997 |
| DE | 198 31 595 | 1/2000 |
| DE | 199 48 232 | 1/2001 |
| DE | 199 49 802 | 4/2001 |
| DE | 199 58 257 | 6/2001 |
| DE | 103 25 294 | 12/2004 |
| DE | 10 2005 928 | 6/2006 |
| EP | 0 566 449 | 10/1993 |
| EP | 1 092 095 | 4/2001 |
| EP | 1 170 510 | 1/2002 |
| EP | 1 691 083 | 8/2006 |
| EP | 1 813 821 | 8/2007 |
| JP | 3-51201 | 5/1991 |
| WO | 90/10795 | 9/1990 |

OTHER PUBLICATIONS

Rexroth Bosch Group, Re 64 295/07.02: "LUDV Control Block of Mono and Sandwich Plate Design Type M7-22" Jul. 2002 (With English Translation).

Mannesmann Rexroth Re 64 282/05.00: "High Pressure Load Sensing Control Block of Sanwich Plate Design Type M4-15" May 2000 (With English Translation).

"Variable Displacemenr Pump A10VO" Series 5, Open Circuits, SAE-Version, Axialpiston, Swash Plate Design. Re 92703/04.96/ Mannesmann Rexroth. Apr. 1996.

"Counterbalance, Standard Poppet Type Differencial Area Special Cavity" VBSO-SEC-42, 04.52.12-X-99-Z. Sep. 2005.

Re-64 552: "Hydralisches Vorsteuergeraet in . . . " Bosch Rexroth AG, May 2006, pp. 1-8.

* cited by examiner

HYDRAULIC CONTROL ASSEMBLY

CROSS-REFERENCE

The invention described and claimed hereinbelow is also described in PCT/EP2007/003280, filed on Apr. 13, 2007 and DE 10 2006 018 706.7, filed on Apr. 21, 2006. This German Patent Application, whose subject matter is incorporated here by reference, provides the basis for a claim of priority of invention under 35 U.S.C. 119(a)-(d).

BACKGROUND OF THE INVENTION

The invention relates to a hydraulic control assembly, which is used in particular for controlling hydraulic consumers in mobile machines.

One such hydraulic control assembly is known for instance from European Patent Disclosure EP 0 566 449 A1. This is a hydraulic control assembly on the load-sensing principle, in which an adjusting pump is set, as a function of the highest load pressure of the hydraulic consumers actuated, such that the pump pressure is above the highest load pressure by a defined pressure difference. The pressure medium flows to the hydraulic consumers via adjustable metering apertures, which are located between an inflow line leading away from the adjusting pump and the hydraulic consumers and are typically integrated with a main control valve serving to control the direction of a hydraulic consumer. By means of the pressure balances downstream of the metering apertures, it is attained that at an adequate quantity of pressure medium furnished by the adjusting pump, a defined pressure difference across the metering apertures exists, regardless of the load pressures of the hydraulic consumers, so that the quantity of pressure medium flowing to a hydraulic consumer is now dependent only on the opening cross section of the respective metering aperture. If a mobile machine is opened wider, then a higher quantity of pressure medium must flow across it in order to generate the defined pressure difference. The adjusting pump is adjusted in each case such that it furnishes the required quantity of pressure medium. This is accordingly also called demand flow regulation. For that purpose, the adjusting pump has a pump regulator, which can be subjected via a load reporting line to the highest load pressure of the simultaneously triggered hydraulic consumers. For limiting the pump pressure, a fixedly set pressure limiting valve is connected to the end portion, connected to the pump regulator, of the load reporting line, and this pressure limiting valve, in cooperation with a throttle restriction that decouples the end portion from the remainder of the load reporting line, limits the pressure reported to the pump regulator and thus also limits the pump pressure.

The pressure balances downstream of the metering apertures are urged in the opening direction by the pressure downstream of the respective metering aperture and in the closing direction by a control pressure prevailing in a rear control chamber; this pressure typically corresponds to the highest load pressure of all the hydraulic consumers supplied by the same hydraulic pump. If, when a plurality of hydraulic consumers are actuated simultaneously, the metering apertures are opened so widely that the quantity of pressure medium furnished by the hydraulic pump, which has been displaced as far as the stop is less than the total quantity of pressure medium supplied], then the quantities of pressure medium flowing to the individual hydraulic consumers are reduced in proportion, regardless of the load pressure at the various hydraulic consumers. This is accordingly called control with load-independent flow distribution (LIFD control). Since in LIFD control the highest load pressure is also sensed, and as a result of the variation in the quantity of pressure medium pumped, the hydraulic pump generates an inflow pressure that is above the highest load pressure by a defined pressure difference, LIFD control is a special case of load-sensing control (LS control).

When there is a plurality of hydraulic consumers, to which pressure medium flows via a respective metering aperture with an upstream pressure balance that is urged in the closing direction only by the pressure upstream of the metering aperture and is urged in the opening direction, via an individual load reporting line, only by the load pressure of the respective hydraulic consumer and by a compression spring, load-independent flow distribution is not obtained. In that case, only LS control and LS consumers are involved. Such control is known for instance from German Patent DE 37 09 504 C2. When a plurality of hydraulic consumers are actuated simultaneously and there is an inadequate quantity of pressure medium furnished by the adjusting pump, initially only the quantity of pressure medium flowing to the hydraulic consumer with the highest load pressure is reduced. When it stops, the quantity of pressure medium flowing to the consumer having the second-highest load pressure then decreases, and so forth.

In the hydraulic control assembly of German Patent DE 37 09 504 C2, an end portion, leading to the pressure balance is connected via a throttle restriction to the remainder of the individual load reporting line of a hydraulic consumer and to a pressure limiting valve. The latter is adjustable as a function of the magnitude of a pilot control signal serving to trigger the main control valve associated with the hydraulic consumer. The pressure balance now acts like a pilot-controlled pressure reduction valve, whose setting is variable by the pilot control signal, and which closes when a defined pressure is reached at its outlet. The pressure at which the pressure balance closes, and which prevails at a hydraulic consumer whose pressure balance is triggered accordingly on the closing side, can thus be limited individually for the consumer and varied via the pilot control signal.

In German Patent Disclosure DE 198 31 595 A1, an LIFD control is shown in which once again the pressure is limited individually for a hydraulic consumer. This requires that the rear control chamber of an LIFD pressure balance be constructively disconnected from the load reporting line. Also, a multi-way valve is necessary, as a function of whose switching position the rear control chamber communicates with the load reporting line or is subjected to pump pressure. The multi-way valve is switched as a function of the load pressure. No provision is made for varying the switching pressure during operation.

SUMMARY OF THE INVENTION

The object of the invention is to refine a hydraulic control assembly having the characteristics of the preamble to claim 1 further in such a way that with pilot control signals for the main control valves, pressure control is possible for a plurality of hydraulic consumers as well in a simple and economical way.

This goal is attained, in a hydraulic control assembly claim 1, in accordance with the invention in that in accordance with the body of claim 1, the pressure limiting valve is adjustable as a function of the magnitude of a pilot control signal serving to trigger a main control valve. Thus according to the invention, the pressure limiting valve, with which the pressure reported to the pump regulator can be limited, is adjustable. The invention is based on the thought that mobile machines exist, in which upon a pressure control of one hydraulic consumer, it is only rarely that a further hydraulic consumer can be actuated. In particular, according to the invention, pressure control of one hydraulic consumer is possible even in an LIFD control assembly, by very simple means and without changes in the individual pressure balances associated with the metering apertures.

If the pressure limiting valve is adjustable as a function of the magnitude of a plurality of pilot control signals, then if a plurality of pilot control signals are present, it is advantageously adjusted as a function of the strongest pilot control signal. The assumption then is that the pressure set at the pressure limiting valve is higher, the stronger the pilot control signal, In an embodiment, according to which the pressure limiting valve is adjustable as a function of a pilot control signal only up to a set value that is below the maximum set value, it is possible for the machine operator to individually predetermine the maximum consumer pressure that can be set with a pilot control signal, depending on the type of machine or the type of work to be handled.

Advantageously, the pressure control can be switched off by means of a further embodiment. In that case, demand flow control is obtained, with a limitation of the load pressure to a high value.

The pressure limiting valve is hydraulically adjustable and has an adjusting piston adjacent to a pressure chamber that communicates with the control line. Fundamentally, the pressure limiting valve may also be of a kind that is electrically or electrohydraulically adjustable. Especially if the main control valve is actuated electrically, such an adjustability of the pressure limiting valve can be favorable. Conversely, in the event of hydraulic actuation of the main control valve, the use of a purely hydraulically adjustable pressure limiting valve appears more advantageous.

If the main control valve is hydraulically actuatable, then a pilot control pressure is typically generated with the aid of an adjustable pressure reduction valve, which has a pressure connection, at which a largely constant supply pressure prevails, preferably at a level of 30 to 35 bar; a tank connection; and a regulating connection, at which the pilot control pressure is regulated. The pressure limiting valve can then be adjusted in a simple way to its maximum set value, if there is an arbitrarily actuatable multi-way valve, as a function of whose switching position the pressure chamber of the pressure limiting valve can be subjected to the pilot control pressure or to the supply pressure.

With the multi-way valve, it is possible in alternation to connect either a line in which the supply pressure prevails or a line in which the pilot control pressure prevails with the pressure chamber of the pressure limiting valve. The multi-way valve can be embodied more simply, however, if a check valve opening toward the pressure chamber is located between the pilot control line and the pressure chamber at the pressure limiting valve. This check valve prevents the high supply pressure from reaching the pilot control line as well and affecting the triggering of the main control valve.

With check valves that are located in a further embodiment, the highest hydraulic pilot control signal can be selected in a simple manner and fed into the pressure chamber of the pressure limiting valve.

To limit pressure control via a pilot control signal to a pressure value that is below the maximum set value of the pressure limiting valve, there is a second pressure limiting valve. Naturally, this pressure limiting valve should not be operative in every case whenever an adjustment of the first pressure limiting valve to the maximum set value by subjecting the pressure chamber to the supply pressure is desired. For that mode of operation, the multi-way valve is advantageously employed, by way of which valve the supply pressure is switched through to the pressure chamber.

The pressure relief of the pressure chamber at the pressure limiting valve is expediently effected via a flow valve, which can be implemented by a simple nozzle but is preferably a flow regulating valve.

Several exemplary embodiments of a hydraulic control assembly according to the invention are shown in the drawings. The invention will now be described in further detail in terms of these exemplary embodiments.

DETAILED DESCRIPTION OF THE PREFERRED EMBODIMENTS

Figure 1:
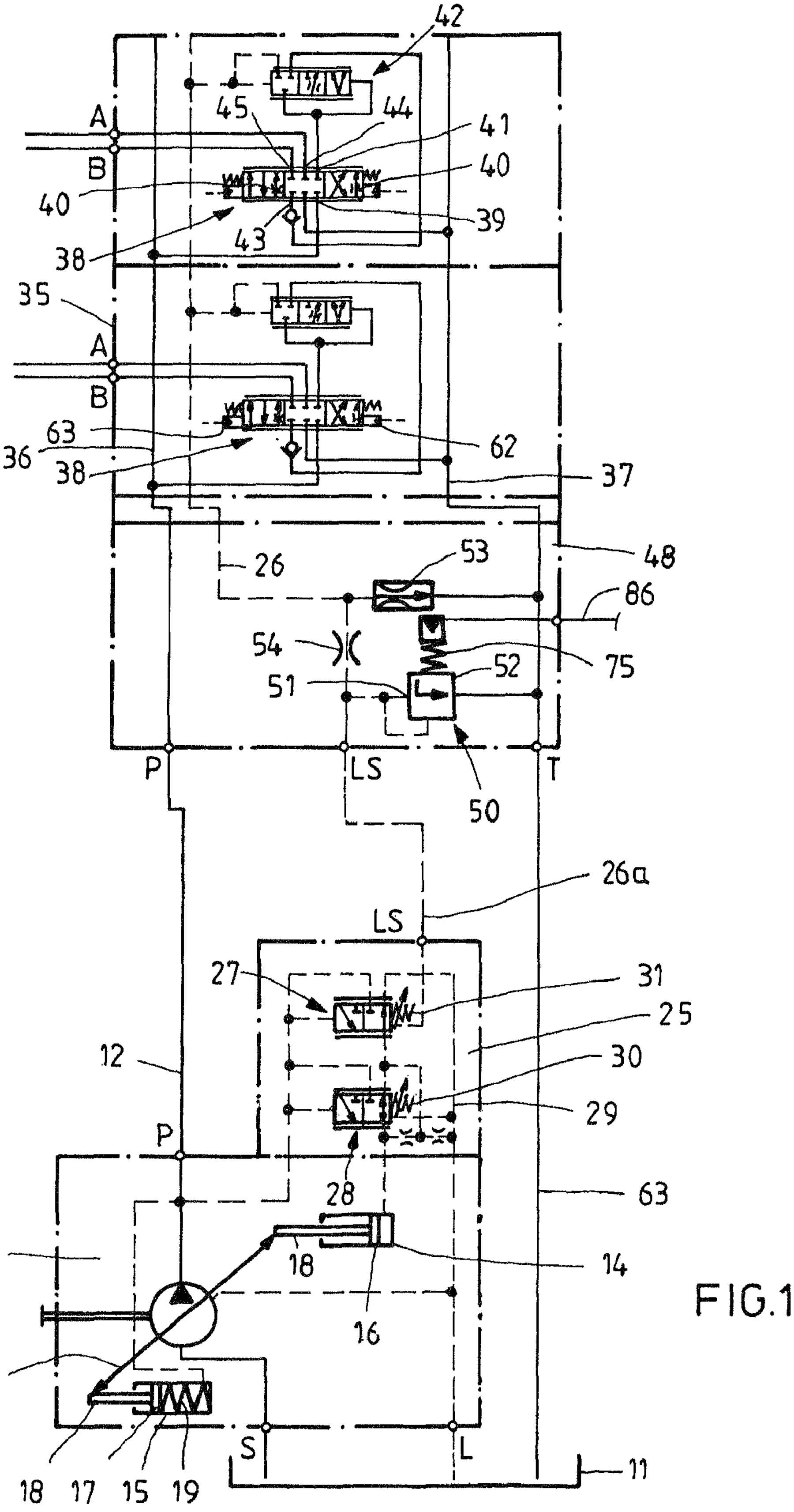
FIG. 1 shows a first exemplary embodiment, operating by the LIFD principle, with the pressure limiting valve that is connected to an end portion of the load reporting line and is hydraulically adjustable as a function of a hydraulic pilot control signal.

In the two hydraulic control assemblies shown, an adjusting pump 10, such as an axial piston pump on the principle of an oblique disk principle, is used as the pressure medium source; it aspirates pressure medium from a tank 11 and feeds it into an inflow line 12, and whose oblique disk 13, represented by a double arrow, can be pivoted in cooperation with two adjusting cylinders 14 and 15. Both adjusting cylinders are differential cylinders, which have a respective piston 16 and 17 and each have one piston rod 18, with which they engage the oblique disk 13. Only the pressure chamber of the adjusting cylinders that is remote from the piston rod is acted upon by the pressure. The piston face of the piston 17 of the adjusting cylinder 15 is smaller than the piston face of the piston 16 of the other adjusting cylinder 14. An extension of the piston rod 18 of the adjusting cylinder 14 causes a decrease, and an extension of the piston rod 18 of the adjusting cylinder 15 causes an increase, in the pivot angle of the oblique disk and hence in the stroke volume of the adjusting pump 10. In addition to the pressure in the adjusting cylinder 15, a compression spring 19 exerts a force on the oblique disk in the direction of increasing the pivot angle.

The pressure chamber of the adjusting cylinder 15 communicates constantly with the inflow line 12. Thus the same pressure prevails in this pressure chamber as in the inflow line. The inflow and outflow of pressure medium to and from the pressure chamber of the adjusting cylinder 14 is controlled by a pump regulating unit 25, which is mounted on the adjusting pump 10 and has an outer connection LS, to which an end portion 26*a* of a load reporting line 26 is connected, and which essentially includes two 3/2-way proportional multi-way valves, of which one is an LS pump regulating valve 27 and the other is a pressure regulating valve 28 that is set to a pressure that is above the load pressures that typically occur. The pressure regulating valve 28 has a first connection, which can be made to communicate with the tank 11 via a relief line 29. A second connection of the pressure regulating valve 28 communicates with the inflow line 12. The third connection, which can be made to communicate with the first or the second connection, communicates with the pressure chamber of the adjusting cylinder 14. A first connection of the LS pump regulating valve communicates with the relief line 29; a second connection communicates with the inflow line 12. The third connection of the valve 27 can be made to communicate with the first or second connection of this valve and communicates constantly with the first connection of the valve 28. A slide, not shown in detail, of the valve 28 is urged by a compression spring 30 in the direction of increasing the pivot angle and by the inflow pressure in the direction of decreasing the pivot angle of the pump 10. A slide, not shown in detail, of the LS pump regulating valve 27, finally, is urged in the direction of increasing the pivot angle of the pump 10 by a compression spring 31 and by the pressure prevailing in the end portion 26*a* of the load reporting line 26, and it is urged in the direction of decreasing the pivot angle by the inflow pressure. A force equilibrium prevails at the slide of the valve 27 when a difference that is equivalent to the force of the spring 31 exists between the inflow pressure and the pressure in the end portion 26*a* of the load reporting line 26. Typically, the difference is between 10 bar and 20 bar. Equilibrium prevails at the slide of the valve 28 when the inflow pressure generates a force that is equivalent to the force of the spring 30. Typically, in an equilibrium, the inflow pressure is in the range of 350 bar.

The exemplary embodiment of FIG. 1 is given the characteristic as an LIFD control assembly by the type of control block 35 that is present, which contains LIFD multi-way valve sections. In FIG. 1, two sections are shown as an example, which are constructed fully identically. It is understood that further sections may also be present.

The control block 35 has an inflow connection P, a tank connection T, a load reporting connection LS, and various consumer connections A and B. An inflow conduit 36, as part of the inflow line 12, begins at the inflow connection P, and a tank conduit 37 of the control block begins at the tank connection T. In the control block, two LIFD multi-way valves 38 with a closed center are embodied, with which two hydraulic consumers, for instance two differential cylinders, can be controlled. The multi-way valves 38 are hydraulically actuatable. In them, a speed control part and a direction control part are embodied, separately from one another, at the same control slide. If a multi-way valve 38 has been moved out of its center position to one of its two lateral work positions, pressure medium arriving from the inflow conduit 36 flows from an inflow chamber 39 via a metering aperture 40 into a first intermediate chamber 41, and from there via the opening cross section of a pressure balance 42 into a second intermediate chamber 43, and then, via the directional part of the multi-way valve, into a consumer chamber 44 or 45. From there, pressure medium reaches the consumer connection A or B. The regulating piston of the pressure balances 42 is urged in the opening direction by the pressure in the intermediate chamber 41, that is, by the pressure downstream of the metering aperture 40, and in the closing direction by the pressure in a load reporting conduit that extends as part of the load reporting line in the control block. The regulating piston of the pressure balances 42 is embodied such that, when the pressure balance is fully open, it establishes a fluidic communication between the intermediate chamber 41 and the load reporting conduit. This is the case when the respective hydraulic consumer is actuated by itself, or in the event of a simultaneous actuation of a plurality of hydraulic consumers, the particular consumer with which the pressure balance is associated has the highest load pressure.

The outer connections P, T and LS of the control block 35 are located in an inlet section 48, through which the conduits 36, 37 and the load reporting line 26 extend to the multi-way valve sections. Inside the inlet section, the end portion 26*a* of the load reporting line 26 is hydraulically decoupled from the remaining portions of the load reporting line by a nozzle 54. Upon a flow of pressure medium through the nozzle 54, a pressure difference occurs at the nozzle, so that the pressure becomes less in the end portion 26*a* of the load reporting line 26 than the other parts of that line. Inside the inlet section, a pressure limiting valve 50 is moreover connected by its inlet connection 51 to the end portion 26*a* of the load reporting line 26 and by its outlet connection 52 to the tank conduit 37. By means of the valve 50 and the nozzle 54, the pressure that can be built up in the end portion 26*a* of the load reporting line is limitable. Upstream of the nozzle 54, a small flow regulating valve 57, located in the inlet section 48, connects the load reporting line 26 and the tank conduit 37 to one another.

Figure 2:
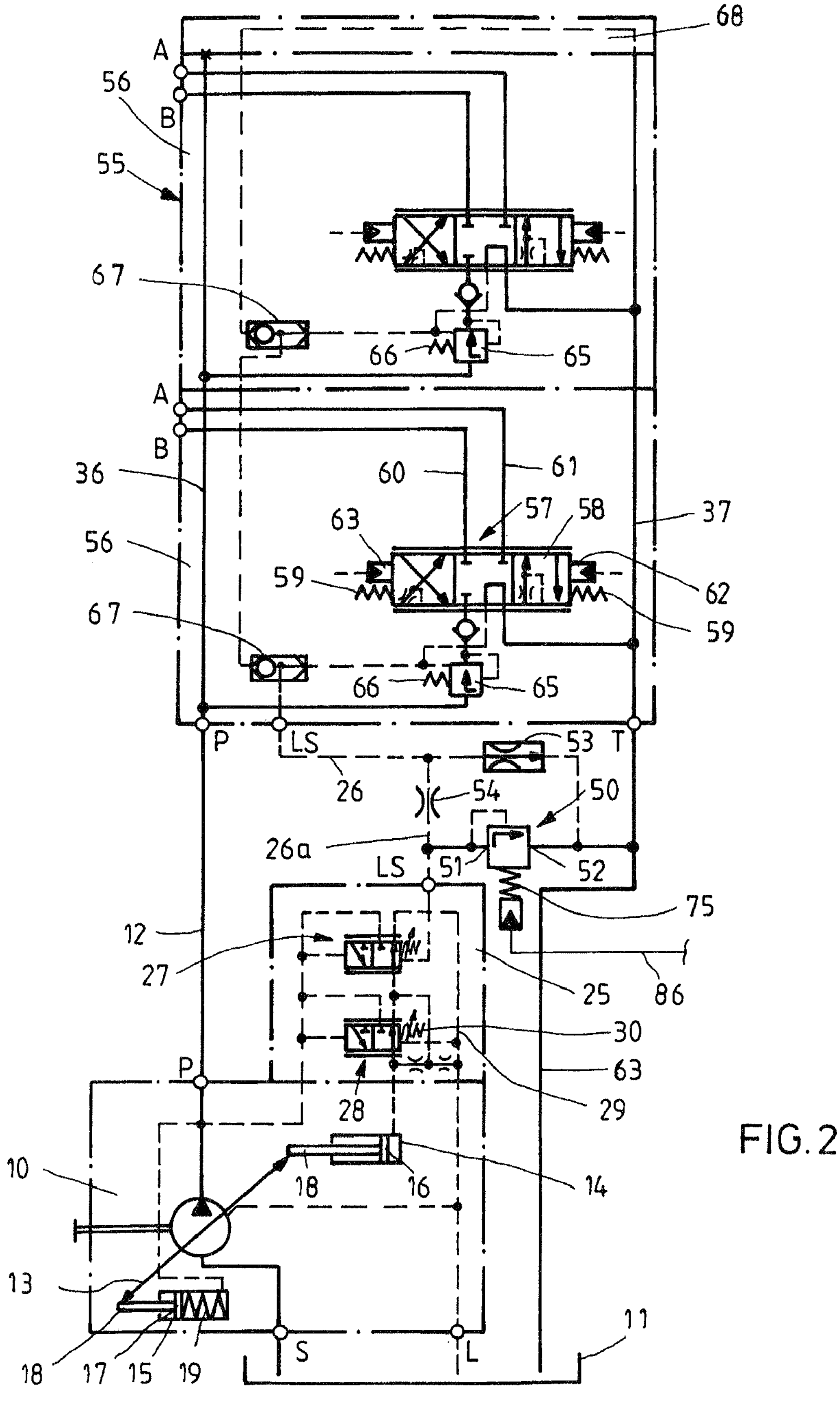
FIG. 2 shows a second exemplary embodiment, operating on the LS principle, with the pressure limiting valve that is connected to the end portion of the load reporting line and is hydraulically adjustable as a function of a hydraulic pilot control signal.

The exemplary embodiment of FIG. 2 is given the characteristic as an LS control assembly by the type of control block 55 present, which is composed of LS multi-way valve disks, and by how the control block of FIG. 1 has an inflow connection P, an outflow connection T, and a load reporting connection LS. In FIG. 2, two multi-way valve disks 56 are shown as examples. It is understood that further disks may also be present.

Each multi-way valve disk 56 serves as a housing for one multi-way valve 57, which is hydraulically actuatable. Both multi-way valve disks 56 are completely identical to one another and contain the same components and conduits. Each multi-way valve 57 includes a control slide 58, which is axially displaceable in a valve bore, not shown in detail, and which solely by the action of two centering springs 59 assumes a middle neutral position. In that position, a consumer conduit 60, which leads to a consumer connection B, a consumer conduit 61, which leads to a consumer connection A, and the inflow conduit 36 and the outflow conduit 37 are all disconnected from one another.

The control slide 58 of a multi-way valve is displaced out of its neutral position in one direction by subjection to the pressure of a control pressure chamber 62 and in the other direction by subjection to the pressure of a control pressure chamber 63. Depending on the displacement position, either the consumer conduit 60 or the consumer conduit 61 communicates with the inflow conduit 36, and the respective other consumer conduit communicates with the outflow conduit 37. Upon a displacement out of the neutral position, the control slide opens a metering aperture between an inflow inlet at the multi-way valve and a consumer conduit, whose opening cross section determines the quantity of pressure medium that flows to the hydraulic consumer.

Specifically, the pressure difference across the metering aperture is kept constant, so that the quantity of pressure medium flowing via the metering aperture is dependent solely on the opening cross section. For that purpose, in the part of the inflow conduit 36 leading to the inflow inlet of the multi-way valve, there is a pressure balance 65, which is urged in the closing direction by the pressure upstream of the metering aperture and in the opening direction by the pressure downstream of the metering aperture and by a compression spring 66. The pressure drop across the metering aperture is equivalent to the force of the compression spring 66 and is set to a value of between 10 bar and 20 bar.

The pressure downstream of the metering aperture is equivalent to the load pressure of the respective hydraulic consumer. This pressure moreover prevails at an inlet to a shuttle valve 67 as well, and the other inlet of the shuttle valve 67 of one multi-way valve disk communicates with the outlet of the shuttle valve 67 of the other multi-way valve disk. The other inlet of the shuttle valve 67 of the last multi-way valve disk communicates with the outlet conduit 37 via an end plate 68. From the outlet of the shuttle valve 67 of the first multi-way valve disk, a conduit leads to the load reporting connection LS of that disk. At this connection LS, the highest load pressure of the hydraulic consumers that are actuatable with the two multi-way valves prevails. The pressure in the inflow conduit 36 is above the highest load pressure by a predetermined pressure difference, for instance of 15 bar. The pressure equivalent to the force of the compression spring 66 of a pressure balance 65 can likewise be 15 bar, so that regardless of whether one hydraulic consumer is now generating the highest load pressure or not, the pressure drop across the metering aperture of the respective multi-way valve is the same.

In the exemplary embodiment of FIG. 2, just as in the exemplary embodiment of FIG. 1, the end portion 26*a* of the load reporting line 26 is hydraulically decoupled from the remaining parts of the load reporting line by a nozzle 54. At the end portion 26*a*, or in other words upstream of the nozzle 54, a pressure limiting valve 50 is connected by its inlet connection 51 to the load reporting line 26 and by its outlet connection 52 to the tank conduit 37. Upstream of the nozzle 54, a small flow regulating valve 53 connects the load reporting conduit 46 and the tank conduit 37 to one another again.

In both exemplary embodiments, the pressure limiting valve 50 is hydraulically adjustable and for that purpose has an adjusting piston 73, which borders on a pressure chamber 74 and is movable a distance predetermined by the spacing of two stops from one another and by its length. A regulating spring 75 of the pressure limiting valve 50 is minimally prestressed when the adjusting piston is in contact against one stop and is maximally prestressed when the adjusting piston is in contact against the other stop. The pressure at which the pressure limiting valve 50 responds can accordingly be set between a minimal and a maximal value. The way in which the pressure limiting valve 50 is adjustable will be described in further detail in conjunction with FIG. 3.

There, two hydraulic pilot control devices 78 can be seen, which both operate in a generally known manner on the basis of directly controlled pressure reduction valves 79, of which one is shown symbolically in each pilot control device. Each pilot control device has a total of four pilot control valves 79 and correspondingly four control outlets 80. In addition, each pilot control device has one tank connection T and one pressure connection P, and at the latter, a largely constant supply pressure prevails, at a level of between 30 and 35 bar. Via a pilot control level 81, which can be pivoted in four directions out of a center position in which tank pressure prevails at all the control outlets 80, the pilot control valves 79 can be adjusted. Depending on the lever deflection, they dictate a defined pilot control pressure at the corresponding control outlet 80. From the control outlets 80, pilot control lines 82 lead to the control pressure chambers 62 and 63 of the multi-way valves 38 (FIG. 1) and 57 (FIG. 2). After a small pivot angle of a lever 81, the pilot control pressure jumps to an initial value and then rises continuously with the pivot angle. At a defined pivot angle, the pilot control pressure then jumps to the supply pressure.

One branch line 83 originates at each pilot control line 82, and a nozzle 84 and in succession with it a check valve, blocking toward the pilot control line, are located in the branch line. Downstream of the check valves 85, all the branch lines 83 discharge into one common control line 86, which leads to the pressure chamber 74 of the pressure limiting valve 50. Thus all the pilot control lines 82 communicate, parallel to one another, each via a respective nozzle 84 and a check valve 85, with the pressure chamber 74 of the pressure limiting valve 50. The control line 86 is moreover connected to a first connection of a 3/2-way valve 87, from which a second connection communicates with the line leading to the supply pressure and a third connection communicates with the inlet to a second pressure limiting valve 88. In a position of repose, which the multi-way valve 87 assumes under the influence of a compression spring 89, the control line 86 communicates with the pressure limiting valve 88. The second connection is blocked. With the aid of an electromagnet 90, the multi-way valve 87 can be put in a switching position in which the control line 86 communicates with the second connection, and the third connection is blocked. The electromagnet 90 communicates via an electric line with an electric switch, accommodated in the one pilot control lever 81, and this switch can be actuated via a push button 91. Thus the electromagnet 90 can be triggered and switched off via the push button 91. The pressure limiting valve 88 is manually adjustable. In the position of repose of the multi-way valve 87, it serves together with the nozzles 84 to make it possible to limit the pressure in the control line 86 to a value that is lower than the maximum pilot control pressure that can be dictated by a pressure reduction valve 79. Via a flow regulating valve 92, the control line 86 can be relieved to the tank 11.

For the discussion of the mode of operation of the control assembly, let the following assumptions be made:

The supply pressure for the pilot control devices is 30 bar. With the pressure reduction valves 79, pilot control pressures of up to 24 bar can be dictated proportionally, and the adjustment of the respective main control valves 38 and 57 begins at 5 bar, and their full stroke is attained at 25 bar. Given a pressure of up to 5 bar prevailing in the control line, and because of an initial prestressing of the spring 75, the pressure limiting valve 50 limits the pressure in the end portion 26*a* of the load reporting line to 50 bar. The set value of the pressure limiting valve 50 rises linearly with the pressure in the control line 86 and reaches a maximum value of 250 bar at a pressure of 25 bar in the control line. The pressure limiting valve 88 is set 20 bar. The pump Δp, that is, the difference between the pressure in the end portion 26*a* of the load reporting line and the pressure in the inflow line 12, is 20 bar.

Thus in the position of repose, shown, of the multi-way valve 87, the following mode of operation is obtained:

When a pilot control lever is deflected and a pressure reduction valve 79 is adjusted, a pilot control pressure builds up in a pilot control line 82. Up to a pilot control pressure of 5 bar, nothing initially happens. After that, the motion of the control slide of the triggered main control valve begins. After a slight initial stroke, the corresponding metering aperture is opened wider and wider. The pressure in the control line 86 and thus the pressure prevailing in the pressure chamber 74 of the pressure limiting valve 50 is slightly less than the pilot control pressure, namely by the pressure difference that is generated by the quantity of pressure medium, flowing via the flow regulator 92, at a nozzle 82. The pressure difference may for example be 0.5 bar. Thus the pressure in the end portion 26*a* of the load reporting line, up to a pilot control pressure of 5.5 bar, is limited to 50 bar, and with increasing pilot control pressure, it rises. For instance, if the pilot control pressure is 15 bar, then the pressure in the control line 86 is 14.5 bar, and the pressure in the end portion 26*a* of the load reporting line is limited to 145 bar.

If the load pressure of the triggered hydraulic consumer is less than or equal to 145 bar, then the pressure limitation in the end portion 26*a* has no effect. The load pressure prevails there. The adjusting pump 10 pumps a sufficient quantity of pressure medium that the pressure in the inflow line 12 is 20 bar above the reported load pressure. The hydraulic consumer is moved at a speed that is determined by the opening cross section of the metering aperture.

If the load pressure is greater than 145 bar, then at the adjusting pump 10 a pressure of 145 bar is reported, since now the pressure limiting valve 50 does not permit the pressure in the end portion 26*a* to become any higher. The pressure in the inflow line is then 165 bar. If the load pressure is less than 165 bar, then with the pressure balance open, a quantity of pressure medium flows to the hydraulic consumer, largely unthrottled, via the metering aperture; this quantity is determined by the opening cross section of the metering aperture and by the difference between the inflow pressure, at the level of 165 bar, and the load pressure. Thus both in LIFD control as in FIG. 1 and in LS control as in FIG. 2, a finely graduated actuation of the hydraulic consumer is possible without throttling losses at a pressure balance.

If the load pressure is higher than 165 bar, then a delivery of pressure medium to the hydraulic consumer is possible only after further deflection of the pilot control valve. However, if the load pressure is greater than 220 bar, then the pilot control lever must be deflected so far that the pressure in the control line 86 becomes 20 bar. The pressure limiting valve 88 then responds. Despite any further lever deflection, the pressure in the control line 86 remains at 20 bar, and thus the pressure in the end portion 26*a* remains at 200 bar and thus the inflow pressure remains at 220 bar. This pressure of 220 bar prevails in the consumer, so that a corresponding force can be exerted.

If a hydraulic consumer with a load pressure of up to 250 bar is to be controlled solely by the degree of opening of the metering aperture and by way of the full stroke of a main control valve, then the button 91 on a pilot control lever is pressed and hence the multi-way valve is reversed. The supply pressure of 30 bar now prevails in the control line 86. The check valves 85 assure that the pilot control pressure predetermined by the pilot control device prevails in the respective pilot control line. The pressure limiting valve 50 is set to its highest value of 250 bar. The pressure in the end portion 26*a* of the load reporting line is now equal to the load pressure, up to a load pressure of 250 bar. The pressure in the inflow line 12 is 20 bar higher than the load pressure. Thus a load of up to 250 bar can be moved, at a speed determined solely by the opening cross section of the associated metering aperture. Up to a load pressure of 270 bar, because of the reduced pressure difference across the metering aperture, a slowed motion is possible. At a load pressure over 270 bar, the load can no longer be moved.

Figure 3:
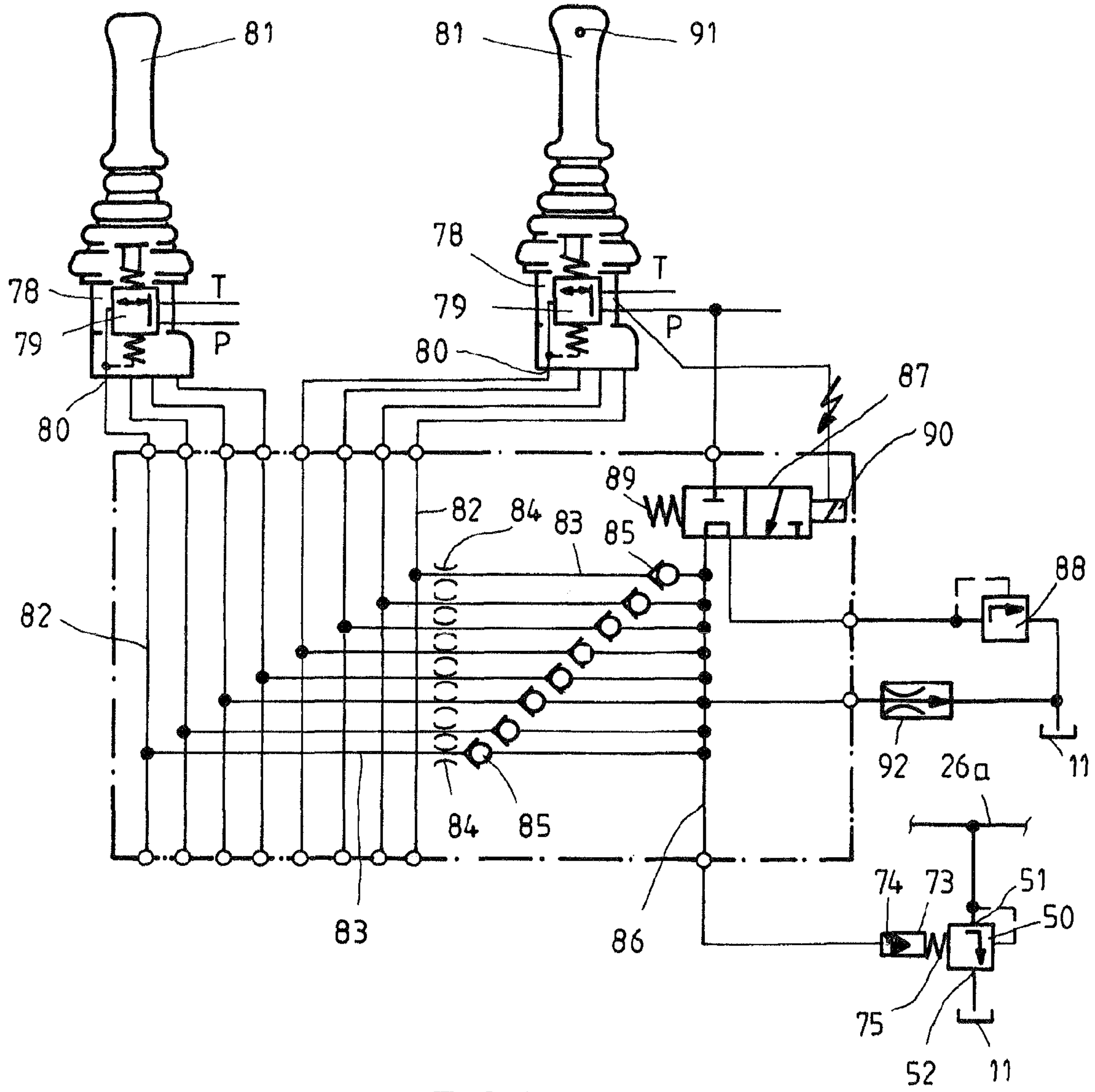
FIG. 3 shows the arrangement, which can be used for both exemplary embodiments, of pilot control valves for actuating the main control valves and for adjusting the pressure limiting valve.

In the exemplary embodiment of FIG. 3, each pilot control line 82 is connected to the control line 86 via a nozzle 84 and a check valve 85. Thus for each of the hydraulic consumers that are controllable via the two pilot control devices 78 and for each direction of motion, a pressure control is possible. Upon a simultaneous actuation of a plurality of hydraulic consumers, the check valves 85 assure that the highest pilot control pressure prevails in the control line 86, and that the pilot control pressures in the pilot control lines 82 do not affect one another.

Naturally for individual consumers or for one motion direction, the possibility of pressure control can also be dispensed with. In that case, there is no branch line 83 between the corresponding pilot control line 82 and the control line 86. In the final analysis, there may also be a branch line only between a single pilot control line 82 and the control line 86.

The invention claimed is:

1. A hydraulic control assembly for controlling hydraulic consumers of a mobile machine, having a load reporting line (26) that can be subjected to the highest load pressure of a plurality of hydraulic consumers, triggered simultaneously each via a respective main control valve (38, 57), and that is connectable by an end portion (26*a*) to a pump regulator (25), and having a pressure limiting valve (50), with which the control pressure in the end portion (26*a*) of the load reporting line (26) is limitable, wherein the pressure limiting valve (50) is adjustable as a function of the magnitude of a pilot control signal serving to trigger a main control valve (38, 57), wherein the pressure limiting valve (50) is hydraulically adjustable and has an adjusting piston (73) bordering on a pressure chamber (74) that communicates with a control line (86), and wherein the pilot control signal is a pilot control pressure, which is generated by an adjustable pilot control valve (79) from a supply pressure and prevails in a pilot control line (82) of a main control valve (38, 57); and that as a function of the switching position of an arbitrarily actuatable multi-way valve (87), the pressure chamber (74) of the pressure limiting valve (50) is capable of being subjected to the pilot control pressure or to the supply pressure.

2. The hydraulic control assembly as defined by claim 1, wherein the pressure limiting valve (50) is adjustable as a function of the magnitude of a plurality of pilot control signals; and that if a plurality of pilot control signals are present, the pressure limiting valve (50) is adjustable as a function of the strongest pilot control signal.

3. The hydraulic control assembly as defined by claim 1, wherein the pressure limiting valve (50) is adjustable as a function of a pilot control signal only up to a set value that is below the maximum set value.

4. The hydraulic control assembly as defined by claim 1, wherein the pressure limiting valve (50) is adjustable to its maximum set value independently of the pilot control signal prevailing just at that time for the main control valve (38, 57).

5. The hydraulic control assembly as defined by claim 1, wherein the pilot control line (82) communicates, via a check valve (85) blocking toward it, with the pressure chamber (74) at the pressure limiting valve (50).

6. The hydraulic control assembly as defined by claim 1, wherein a plurality of pilot control lines (82), capable of being subjected to a pilot control pressure, lead to one or more main control valves (38, 57); and that a plurality of pilot control lines (82), parallel to one another, communicate, each via a respective check valve (85), with the pressure chamber (74) at the pressure limiting valve (50).

7. The hydraulic control assembly as defined by claim 1, wherein there is a second pressure limiting valve (88), with which the pressure is limitable in the pressure chamber (74) of the first pressure limiting valve (50) and which is set to a limit pressure that is below the maximum pilot control pressure and is switchable to be operative when the pressure chamber (74) of the first pressure limiting valve (50) is capable of being subjected to a pilot control pressure.

8. The hydraulic control assembly as defined by claim 7, wherein the multi-way valve (87) has a first switching position, in which the second pressure limiting valve (88) is connected to the pressure chamber (74) of the first pressure limiting valve (50) and the pressure chamber (74) is disconnected from the supply pressure, and a second switching position, in which the second pressure limiting valve (88) is disconnected from the pressure chamber (74) of the first pressure limiting valve (50) and the pressure chamber (74) is capable of being subjected to supply pressure.

9. The hydraulic control assembly as defined by claim 8, wherein the first switching position is the position of repose of the multi-way valve (87).

10. The hydraulic control assembly as defined by claim 1, wherein a flow valve (92) is connected to the control line (86), and by way of this valve, to reduce pressure, pressure medium can be released from the control line (86) to a tank (T).

11. The hydraulic control assembly as defined by claim 10, wherein the flow valve (92) is a flow regulating valve.

* * * * *